US011258082B2

(12) United States Patent
Fukatsu (10) Patent No.: US 11,258,082 B2
(45) Date of Patent: Feb. 22, 2022

(54) FUEL CELL AND TEMPERATURE CONTROL METHOD

(71) Applicant: BROTHER KOGYO KABUSHIKI KAISHA, Nagoya (JP)

(72) Inventor: Yoshiaki Fukatsu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 57 days.

(21) Appl. No.: 16/575,023

(22) Filed: Sep. 18, 2019

(65) Prior Publication Data

US 2020/0014043 A1 Jan. 9, 2020

Related U.S. Application Data

(63) Continuation of application No. PCT/JP2018/011012, filed on Mar. 20, 2018.

(30) Foreign Application Priority Data

Mar. 22, 2017 (JP) .............................. JP2017-055990

(51) Int. Cl.
  *H01M 8/04* (2016.01)
  *H01M 8/04701* (2016.01)
  *H01M 8/065* (2016.01)
(52) U.S. Cl.
  CPC ....... *H01M 8/04738* (2013.01); *H01M 8/065* (2013.01)
(58) Field of Classification Search
  CPC .......................... H01M 8/04738; H01M 8/065
  See application file for complete search history.

(56) References Cited

U.S. PATENT DOCUMENTS

2008/0044704 A1 2/2008 Kubo et al.
2013/0260281 A1 10/2013 Imura et al.
(Continued)

FOREIGN PATENT DOCUMENTS

JP  2001-295996 A  10/2001
JP  2001295996 A   10/2001
(Continued)

OTHER PUBLICATIONS

Extended European Search Report issued in connection with EP Application No. 18771998.4 dated Nov. 30, 2020.
(Continued)

*Primary Examiner* — Jimmy Vo
(74) *Attorney, Agent, or Firm* — K&L Gates LLP (57) ABSTRACT

The fuel cell includes a power generation unit, a plurality of storage containers that are detachable and house hydrogen absorbing alloy, a heat medium passage through which a heat medium flows, and a temperature control unit for heating the storage containers by controlling the temperature of the heat medium and causing the heat medium to flow. The temperature control unit can carry out a first temperature control mode of controlling the temperature of the heat medium to be equal to or higher than a first temperature, and a second temperature control mode of controlling the temperature of the heat medium to be equal to or higher than a second temperature. The temperature control unit determines whether the second temperature mode is to be carried out or not based on the pressure or the temperature of an attached storage container when a new storage container is attached.

7 Claims, 5 Drawing Sheets

(56) References Cited

U.S. PATENT DOCUMENTS

2013/0260284 A1 10/2013 Imura et al.
2016/0043419 A1* 2/2016 Thampan .......... H01M 8/04216
429/423

FOREIGN PATENT DOCUMENTS

| JP | 2005-063703 | A | 3/2005 |
| JP | 2005063703 | A | 3/2005 |
| JP | 2013-214484 | A | 10/2013 |
| JP | 2013214484 | A | 10/2013 |
| WO | 2013/065083 | A1 | 5/2013 |
| WO | 2013/145776 | A1 | 5/2013 |
| WO | 2013/145776 | A1 | 10/2013 |

OTHER PUBLICATIONS

International Search Report issued in connection with International Patent Application No. PCT/JP2018/011012, dated Jun. 19, 2018. (3 pages).

International Preliminary Report on Patentability issued in International Application No. PCT/JP2018/011012, dated Jun. 19, 2018.

* cited by examiner

FUEL CELL AND TEMPERATURE CONTROL METHOD

CROSS-REFERENCE TO RELATED APPLICATIONS

This application is a continuation application of PCT International Application No. PCT/JP2018/011012 which has an International filing date of Mar. 20, 2018 and designated the United States of America, and claiming priority on Patent Application No. 2017-055990 filed in Japan on Mar. 22, 2017.

FIELD

The present disclosure relates to a fuel cell, which is provided with a storage container housing hydrogen absorbing alloy and generates electricity using hydrogen as fuel, and a method of controlling the temperature in a fuel cell.

BACKGROUND

Some fuel cells react hydrogen and oxygen so as to generate electricity. A method that uses hydrogen absorbing alloy is known as a method of storing hydrogen. A fuel cell that utilizes hydrogen absorbing alloy is provided with a storage container that houses hydrogen absorbing alloy. Since a reaction that the hydrogen absorbing alloy releases hydrogen is an endothermic reaction, it is necessary to heat a storage container in order to obtain hydrogen necessary for power generation. Moreover, a reaction that hydrogen and oxygen reacts and electricity is generated is an exothermic reaction.

International Patent Publication WO 2013/065083 discloses a fuel cell configured to heat a storage container using heat to be generated during power generation. In particular, a storage container is heated by circulating a heat medium between a storage container and a fuel cell stack configured to react hydrogen and oxygen so as to generate electricity.

SUMMARY

In order to continuously generate electricity in a fuel cell, it is necessary to provide a plurality of storage containers and sequentially replace storage containers, hydrogen of which has been consumed. However, the temperature of an unused storage container is sometimes extremely low. In a case of trying to heat a storage container having an extremely low temperature with a heat medium, the temperature of the heat medium lowers, the heat medium lacks the heat quantity for heating the other storage container, the hydrogen pressure of the other storage container lowers, and the quantity of hydrogen released may possibly become insufficient. Therefore, continuous power generation by the fuel cell may possibly become difficult.

The present disclosure provides a fuel cell and a temperature control method that enable continuous power generation by properly controlling the temperature of storage containers.

A fuel cell according to the present disclosure is a fuel cell characterized by comprising: a power generation unit configured to react hydrogen and oxygen so as to generate electricity; a plurality of storage containers that are detachable and house hydrogen absorbing alloy storing hydrogen to be supplied to the power generation unit; a heat medium passage through which a heat medium for heating the plurality of storage containers flows; and a temperature control unit configured to control the temperature of the heat medium, wherein the temperature control unit can carry out a first temperature control mode of controlling the temperature of the heat medium to be equal to or higher than a predetermined first temperature, and a second temperature control mode of controlling the temperature of the heat medium to be equal to or higher than a predetermined second temperature that is higher than the first temperature, and determines whether the second temperature control mode is to be carried out or not based on the pressure in a newly attached storage container or the temperature of the storage container when a new storage container is attached.

The fuel cell according to the present disclosure comprises a plurality of storage containers that are detachable and house hydrogen absorbing alloy storing hydrogen to be supplied to the power generation unit, and heats the storage containers by causing a heat medium to flow through a heat medium passage and carrying out a first temperature control mode of controlling the temperature of the heat medium to be equal to or higher than a first temperature. The fuel cell can also carry out a second temperature control mode of controlling the temperature of the heat medium to be equal to or higher than a second temperature that is higher than the second temperature. When a new storage container is attached, the fuel cell determines whether the second temperature control mode is to be carried out or not based on the pressure in the newly attached storage container or the temperature of the newly attached storage container. In a case where the temperature of the newly attached storage container is low, the pressure in the storage container is low. It is therefore possible to estimate that the temperature of the newly attached storage container is low based on the pressure. By carrying out the second temperature control mode in a case where the temperature of the newly attached storage container is low, the temperature of the heat medium is controlled to be a high temperature, and lack of the heat quantity of the heat medium due to a low temperature of the newly attached storage container is suppressed.

A fuel cell according to the present disclosure is a fuel cell characterized by comprising: a power generation unit configured to react hydrogen and oxygen so as to generate electricity; a plurality of storage containers that are detachable and house hydrogen absorbing alloy storing hydrogen to be supplied to the power generation unit; a heat medium passage through which a heat medium for heating the plurality of storage containers flows; and a temperature control unit configured to heat the plurality of storage containers by controlling the temperature of the heat medium and causing the heat medium to flow through the heat medium passage, wherein the temperature control unit can carry out a first temperature control mode of controlling the temperature of the heat medium to be equal to or higher than a predetermined first temperature, and a second temperature control mode of controlling the temperature of the heat medium to be equal to or higher than a predetermined second temperature that is higher than the first temperature, and carries out the second temperature control mode when a new storage container is attached.

The fuel cell according to the present disclosure carries out the second temperature control mode when a new storage container is attached. The temperature of the heat medium is controlled to be a high temperature in accordance with attachment of the new storage container, and lack of the heat quantity of the heat medium due to a low temperature of the newly attached storage container is suppressed.

A fuel cell according to the present disclosure is a fuel cell characterized by comprising: a power generation unit configured to react hydrogen and oxygen so as to generate electricity; a plurality of storage containers that are detachable and house hydrogen absorbing alloy storing hydrogen to be supplied to the power generation unit; a heat medium passage through which a heat medium for heating the plurality of storage containers flows; and a temperature control unit configured to heat the plurality of storage containers by controlling the temperature of the heat medium and causing the heat medium to flow through the heat medium passage, wherein the temperature control unit can carry out a first temperature control mode of controlling the temperature of the heat medium to be equal to or higher than a predetermined first temperature, and a second temperature control mode of controlling the temperature of the heat medium to be equal to or higher than a predetermined second temperature that is higher than the first temperature, and determines whether the second temperature control mode is to be carried out or not based on the pressure or the temperature in an unused storage containers in a case where there is the unused storage container in the plurality of storage containers.

The fuel cell according to the present disclosure determines whether the second temperature control mode is to be carried out or not based on the pressure or the temperature in an unused storage container in a case where there is the unused storage container. It is possible to estimate that the temperature of the storage container is low based on the pressure. By carrying out the second temperature control mode in a case where the temperature of the unused storage container is low, the temperature of the heat medium is controlled to be a high temperature, and lack of the heat quantity of the heat medium due to a low temperature of the unused storage container is suppressed.

A temperature control method according to the present disclosure is a temperature control method, which uses a plurality of storage containers that are detachable and house hydrogen absorbing alloy storing hydrogen, and a heat medium passage through which a heat medium for heating the plurality of storage containers flows, the temperature control method being characterized by comprising steps of: controlling the temperature of the heat medium to be equal to or higher than a predetermined first temperature; heating the plurality of storage containers; controlling the temperature of the heat medium to be equal to or higher than a predetermined second temperature that is higher than the first temperature without heating an attached storage container when a new storage container is attached; and starting heating of the attached storage container after the temperature of the heat medium becomes equal to or higher than the second temperature.

In the temperature control method according to the present disclosure, the temperature of the heat medium is controlled to be equal to or higher than the first temperature, and the plurality of storage containers are heated. When a new storage container is attached, the temperature of the heat medium is controlled to be equal to or higher than a higher second temperature without heating the attached storage container. After the temperature of the heat medium becomes equal to or higher than the second temperature, heating of the attached storage container is started. By heating a newly attached storage container after the temperature of the heat medium is controlled to be a high temperature, lack of the heat quantity of the heat medium due to a low temperature of the newly attached storage container is suppressed.

A fuel cell and a temperature control method according to the present disclosure suppress lack of the heat quantity of the heat medium and prevent lowering of the temperature of the other storage container when a new storage container is attached or in a case where there is an unused storage container. This exhibits excellent effects that lowering of the hydrogen pressure is prevented and that a fuel cell can execute continuous power generation, and the like.

The above and further objects and features will more fully be apparent from the following detailed description with accompanying drawings.

DETAILED DESCRIPTION

Embodiment 1

Figure 1:
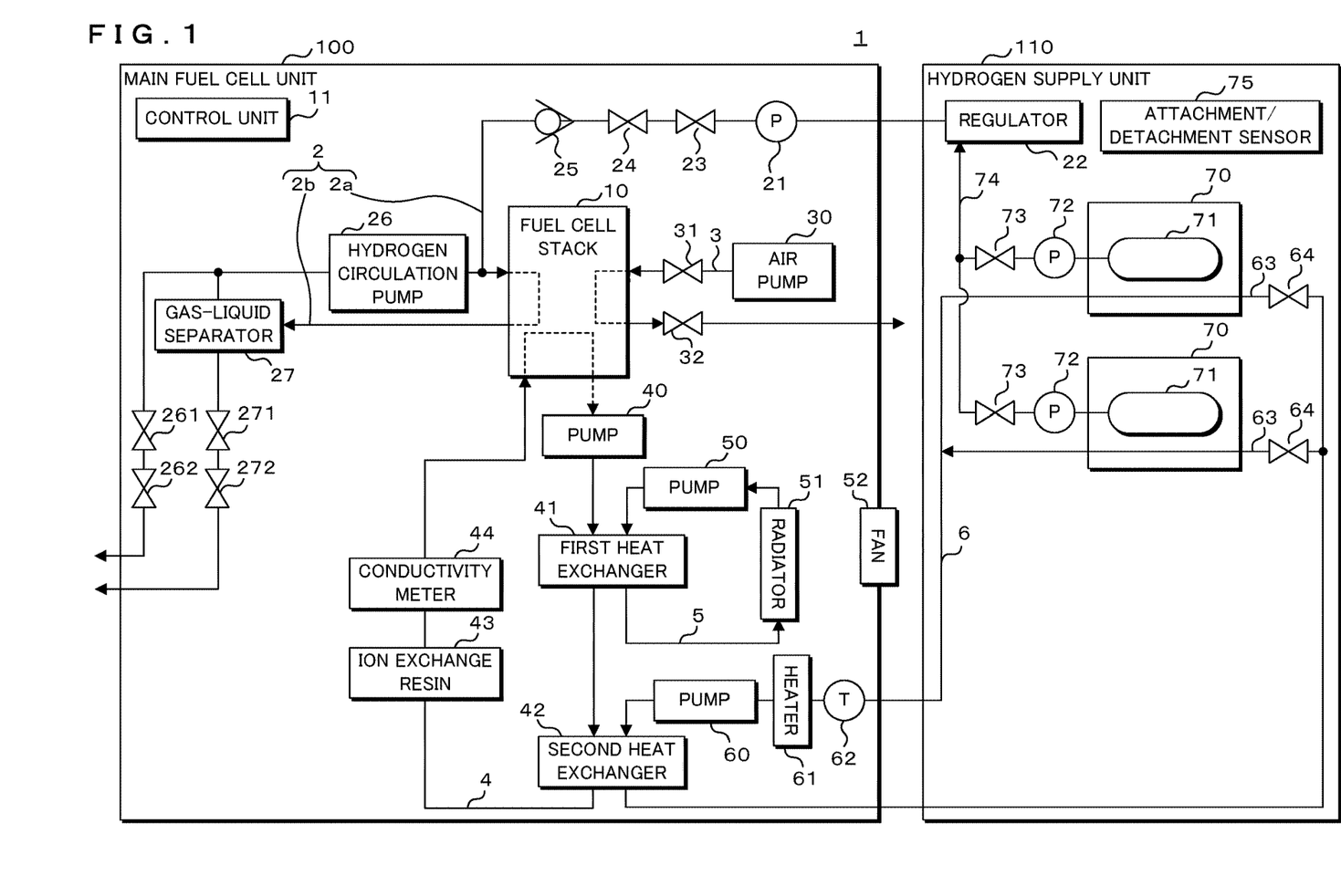
FIG. 1 is a conceptual diagram illustrating the configuration of a fuel cell according to Embodiment 1.

A fuel cell 1 drawn in FIG. 1 is a fuel cell such as a polymer electrolyte fuel cell, for example, and reacts hydrogen and oxygen so as to generate electricity. The fuel cell 1 is provided with a main fuel cell unit 100 and a hydrogen supply unit 110. The main fuel cell unit 100 is provided with a fuel cell stack 10, a control unit 11, a hydrogen flow passage 2, an air flow passage 3, a stack coolant passage 4, a radiator passage 5, and a heat medium passage 6. The hydrogen flow passage 2 includes a hydrogen supply passage 2a and a hydrogen circulation passage 2b.

The control unit 11 is connected with the respect components of the fuel cell 1. The control unit 11 is provided with a CPU (Central Processing Unit) configured to control operations of the respective components, and a storage unit configured to store an operation program of the fuel cell 1. It is to be noted that connection of the control unit 11 and each component is omitted in FIG. 1.

The fuel cell stack 10 is prepared by sandwiching a solid polymer electrolyte membrane with a negative electrode and a positive electrode from both sides so as to form a membrane electrode assembly, arranging a pair of separators on both sides of the membrane electrode assembly so as to construct a tabular unit cell, and laminating and packaging a plurality of such unit cells. When fuel gas including hydrogen which has flown in through the hydrogen flow passage 2 comes into contact with the negative electrode, and oxidant gas including oxygen such as air from the air flow passage 3 flows into and comes into contact with the positive electrode, an electrochemical reaction occurs at both electrodes, and electromotive force is generated. In such an electrochemical reaction, water is generated from a reaction of hydrogen ion, which has been transmitted through the solid polymer electrolyte membrane from the negative electrode side, and oxygen in the oxidant gas. The fuel cell stack 10 corresponds to a power generation unit according to the present disclosure.

The hydrogen supply passage 2a is a flow passage through which hydrogen to be supplied from the hydrogen supply unit 110 to the fuel cell stack 10 flows. One end portion of the hydrogen supply passage 2a is connected with the hydrogen supply unit 110, while the other end portion is connected with a part of the hydrogen circulation passage 2b close to the negative electrode of the fuel cell stack 10. At the hydrogen supply passage 2a, a pressure sensor 21, an on-off valve 23, an on-off valve 24, and a check valve 25 are provided in this order from the hydrogen supply unit 110 side. The hydrogen circulation passage 2b is a flow passage through which hydrogen discharged from the fuel cell stack 10 is circulated to the fuel cell stack 10. The hydrogen circulation passage 2b is provided with a hydrogen circulation pump 26 and a gas-liquid separator 27. The gas-liquid separator 27 is coupled with an air discharge valve 261 and an air discharge valve 262, and with a water discharge valve 271 and a water discharge valve 272. For example, the on-off valve 23, the on-off valve 24, the air discharge valve 261, the air discharge valve 262, the water discharge valve 271, and the water discharge valve 272 are electromagnetic valves that can be controlled by the control unit 11 to be in an open state and a close state, and more preferably are normally closed electromagnetic valves.

When the on-off valve 23 and the on-off valve 24 are opened, hydrogen flows from the hydrogen supply unit 110 through the on-off valve 23, the on-off valve 24, the check valve 25, and the hydrogen supply passage 2a. Furthermore, hydrogen is caused by the hydrogen circulation pump 26 to flow through the hydrogen circulation passage 2b, is delivered to the negative electrode side part of the fuel cell stack 10, and flows through a flow passage in the negative electrode side part. Hydrogen, which has flown through the flow passage and has been discharged from the fuel cell stack 10, flows through the hydrogen circulation passage 2b and is delivered to the gas-liquid separator 27. The gas-liquid separator 27 separates water and gas including hydrogen and impurities. Separated gas is delivered from the gas-liquid separator 27 to the hydrogen circulation pump 26 and is circulated through the hydrogen circulation passage 2b. After a predetermined amount of water separated in the gas-liquid separator 27 is stored, the water discharge valve 271 and the water discharge valve 272 are opened, so that the water is discharged to outside. The air discharge valve 261 and the air discharge valve 262 are opened with proper timing, so that gas including impurities is discharged to outside.

The air flow passage 3 is a passage through which air to be supplied to the fuel cell stack 10 flows. The air flow passage 3 is provided with an air pump 30. The air pump 30 takes air in and supplies air to the fuel cell stack 10 through the air flow passage 3. An on-off valve 31 is provided between the air pump 30 and the fuel cell stack 10. An on-off valve 32 is provided at a part through which air flows out of the fuel cell stack 10. When the on-off valve 31 and the on-off valve 32 are opened, air delivered from the air pump 30 flows through the air flow passage 3 and the on-off valve 31, is introduced to a positive electrode side part of the fuel cell stack 10, and flows through a flow passage in the positive electrode side part. Air which has flown through the flow passage is discharged from the fuel cell stack 10 and is discharged to outside through the on-off valve 32.

The stack coolant passage 4 is a flow passage through which cooling water for cooling the fuel cell stack 10 flows and is circulated. It is to be noted that a heat medium (e.g., ethylene glycol) other than water may be used for cooling the fuel cell stack 10. A pump 40, a first heat exchanger 41, a second heat exchanger 42, an ion exchange resin 43, and a conductivity meter 44 are provided in the middle of the stack coolant passage 4. The pump 40 circulates cooling water through the stack coolant passage 4 so as to cool the fuel cell stack 10. Cooling water which flows through the stack coolant passage 4 is introduced by the pump 40 to the fuel cell stack 10 and flows through a flow passage in the fuel cell stack 10. Cooling water which has flown through the flow passage in the fuel cell stack 10 is delivered from the pump 40, flows through the first heat exchanger 41, the second heat exchanger 42, the ion exchange resin 43, and the conductivity meter 44, and is introduced again to the fuel cell stack 10. The ion exchange resin 43 removes ions included in cooling water. The conductivity meter 44 measures the conductivity of the cooling water.

The radiator passage 5 is a flow passage through which heat radiation liquid for radiating heat of cooling water passing through the first heat exchanger 41 flows and is circulated. The radiator passage 5 is coupled with the first heat exchanger 41. The radiator passage 5 is provided with a pump 50 and a radiator 51. The pump 50 circulates the heat radiation liquid through the radiator passage 5 so as to radiate heat of cooling water passing through the first heat exchanger 41. Heat radiation liquid delivered from the pump 50 flows through the first heat exchanger 41 and the radiator 51 and returns to the pump 50. An example of heat radiation liquid is antifreeze composed mainly of ethylene glycol. A fan 52 is provided in proximity to the radiator 51. Heat of cooling water is conducted to the heat radiation liquid in the first heat exchanger 41. Wind delivered from the fan 52 blows against the radiator 51, and heat of the heat radiation liquid passing through the radiator 51 is radiated. Heat of cooling water is radiated in such a manner.

The heat medium passage 6 is a flow passage through which a heat medium flows and is circulated. The heat medium is fluid and is, for example, water or antifreeze (e.g., ethylene glycol). The heat medium passage 6 is coupled with the second heat exchanger 42. The heat medium passage 6 is provided with a pump 60, a heater 61, and a temperature sensor 62. Moreover, the heat medium passage 6 is provided to extend through both of the main fuel cell unit 100 and the hydrogen supply unit 110. The heat medium passage 6 has a plurality of branch passages 63, and on-off valves 64 configured to open and close the respective branch passages 63. The branch passages 63 and the on-off valves 64 are provided in the hydrogen supply unit 110. The pump 60 circulates a heat medium through the heat medium passage 6. In the second heat exchanger 42, heat is conducted from cooling water to a heat medium. Moreover, the heater 61 heats the heat medium. The temperature sensor 62 measures the temperature of the heat medium. For example, the on-off valves 64 are electromagnetic valves that can be controlled by the control unit 11 to be in an open state and a close state, and more preferably are normally closed electromagnetic valves.

The hydrogen supply unit 110 is provided with a regulator 22 and a plurality of hydrogen storage units 70. The regulator 22 is connected with one end portion of the hydrogen supply passage 2a. The plurality of hydrogen storage units 70 house a plurality of storage containers 71 housing hydrogen absorbing alloy that stores hydrogen. Although FIG. 1 illustrates an example in which two hydrogen storage units 70 are provided, the hydrogen supply unit 110 may be provided with three or more hydrogen storage units 70. Moreover, one hydrogen storage unit 70 may house a plurality of storage containers 71. Each hydrogen storage unit 70 is attachable to and detachable from the hydrogen supply unit 110. When a hydrogen storage unit 70 is attached or detached, a storage container 71 is attached to or detached from the hydrogen supply unit 110. Each storage container 71 houses hydrogen absorbing alloy. Each storage container 71 is configured to conduct external heat to the hydrogen absorbing alloy. The plurality of hydrogen storage units 70 are in proximity to, in contact with, or coupled with the plurality branch passages 63. Each hydrogen storage unit 70 is configured to conduct heat of a heat medium passing through a branch passage 63 to a storage container 71. For example, each hydrogen storage unit 70 is a box, and a heat transfer material or a heat transfer mechanism is provided between the branch passage 63 and the storage container 71 which are in proximity to, in contact with, or coupled with each other. Moreover, for example, a structure in which each branch passage 63 extends through a hydrogen storage unit 70 and the branch passage 63 is in contact with a storage container 71 may be employed.

Each storage container 71 is coupled with a pressure sensor 72 and a hydrogen supply valve 73. Each pressure sensor 72 measures the pressure in a storage container 71. The pressure sensors 72 correspond to a detector according to the present disclosure. The hydrogen supply valves 73 are connected with a hydrogen supply passage 74. For example, the hydrogen supply valves 73 are electromagnetic valves that can be controlled by the control unit 11 to be in an open state and a close state, and more preferably are normally closed electromagnetic valves. The hydrogen supply passage 74 is connected with the regulator 22. In a state where a hydrogen storage unit 70 is detached from the hydrogen supply unit 110, a hydrogen supply valve 73 is closed. In a state where a hydrogen storage unit 70 is attached to the hydrogen supply unit 110, a hydrogen supply valve 73 is opened. In a state where a hydrogen supply valve 73 is opened, it becomes possible to supply hydrogen from a storage container 71 through a hydrogen supply passage 74 and the regulator 22 to the main fuel cell unit 100. The pressure sensors 72 are located upstream the hydrogen supply valves 73 in the flow of hydrogen from the storage containers 71 to the main fuel cell unit 100. The pressure sensors 72 and the hydrogen supply valves 73 may be fixed to the hydrogen supply passage 74, or may be fixed to the hydrogen storage units 70 so as to be attachable to and detachable from the hydrogen supply unit 110 together with the hydrogen storage units 70.

The hydrogen supply unit 110 is further provided with an attachment/detachment sensor 75 configured to detect attachment or detachment of the plurality of storage containers 71. For example, the attachment/detachment sensor 75 is a sensor configured to detect the operation of an unillustrated opening/closing mechanism provided at a connection part of each storage container 71 and each hydrogen supply passage 74. Moreover, the attachment/detachment sensor 75 may be an input switch to be operated by a user who manually attaches or detaches a hydrogen storage unit 70 so as to input attachment or detachment of a storage container 71.

The heat medium is heated by the second heat exchanger 42 and the heater 61 and is caused by the pump 60 to flow through the heat medium passage 6. In a state where the on-off valves 64 are opened, the heat medium flows through the branch passages 63, heat is conducted from the heat medium to the storage containers 71, and the storage containers 71 are heated. A storage container 71 is selectively heated by causing the heat medium to flow selectively through any one branch passage 63. When a storage container 71 is heated, hydrogen absorbing alloy housed in the storage container 71 is heated, and hydrogen is released from the hydrogen absorbing alloy. The released hydrogen flows from the storage container 71 through a hydrogen supply passage 74, the regulator 22, and the hydrogen flow passage 2, and is supplied to the fuel cell stack 10. The regulator 22 controls the hydrogen supply pressure. When hydrogen is supplied to the fuel cell stack 10, the fuel cell stack 10 generates electricity.

In this embodiment, the fuel cell 1 continuously generates electricity by sequentially replacing storage containers 71 in which hydrogen has been consumed. A storage container 71 is replaced by replacing a hydrogen storage unit 70. The control unit 11 performs processing to heat the storage containers 71 so that electricity is continuously generated. Next, the processing to heat the storage containers 71 will be described. The following description will illustrate a fuel cell 1 provided with two hydrogen storage units 70 as an example of the fuel cell 1. One of the two hydrogen storage units 70 will be expressed as a hydrogen storage unit (A) 70, while the other will be expressed as a hydrogen storage unit (B) 70. One of the storage containers 71, the pressure sensors 72, the branch passages 63, and the on-off valves 64 will be expressed as a storage container (A) 71, a pressure sensor (A) 72, a branch passage (A) 63, and an on-off valve (A) 64, while the other will be expressed as a storage container (B) 71, a pressure sensor (B) 72, a branch passage (B) 63, and an on-off valve (B) 64.

Figure 2:
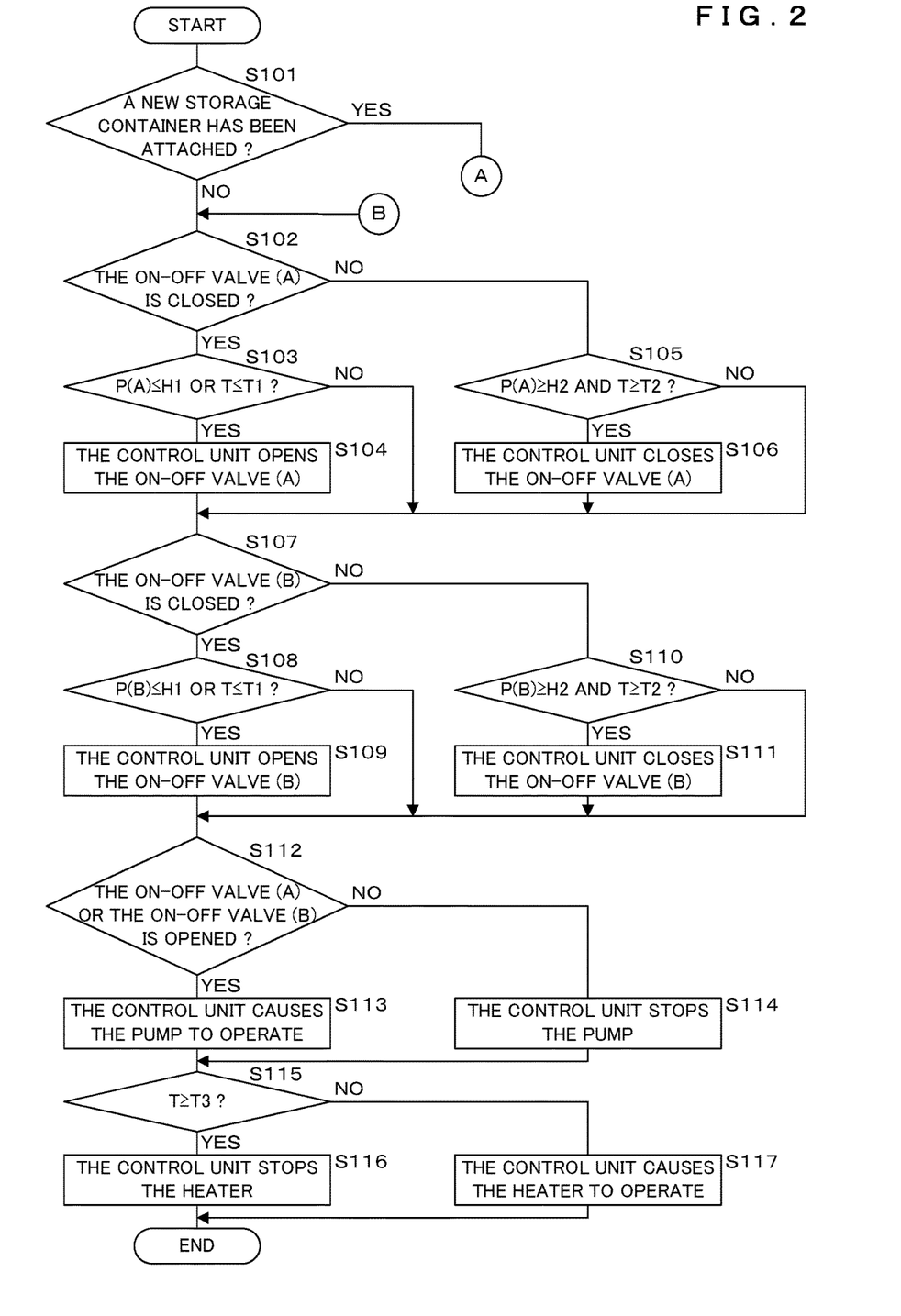
FIG. 2 is a flowchart illustrating the process procedures for heating a storage container in Embodiment 1.
Figure 3:
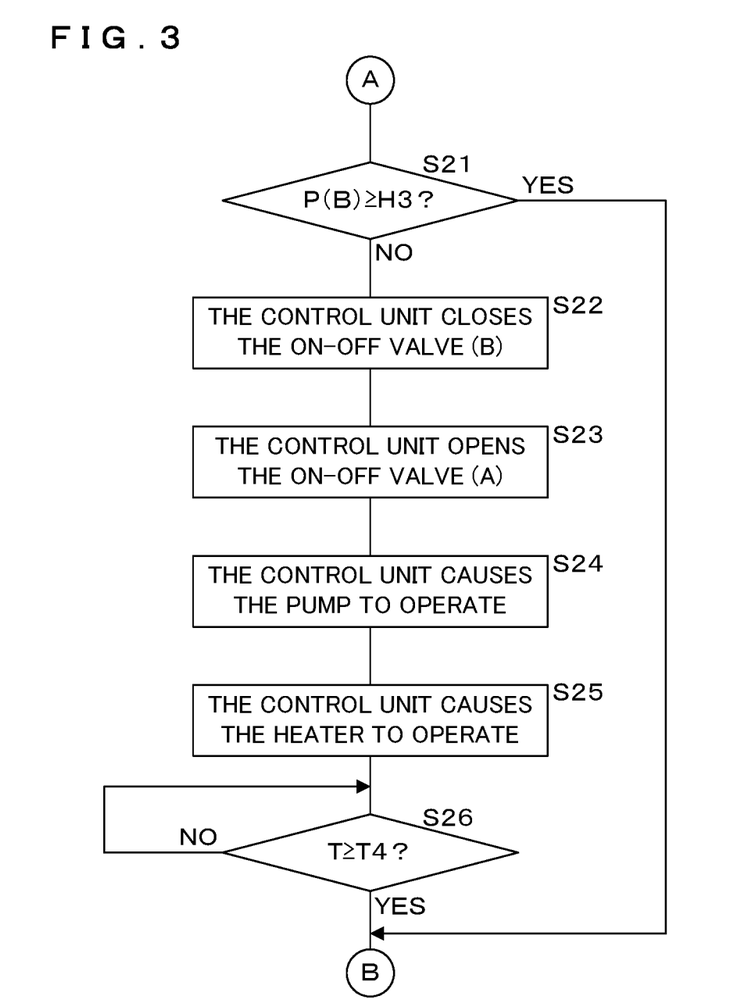
FIG. 3 is a flowchart illustrating the process procedures for heating a storage container in Embodiment 1.

FIGS. 2 and 3 are a flowchart illustrating the process procedures of heating a storage container 71 in Embodiment 1. The control unit 11 determines whether a new storage container 71 has been attached or not according to the detection result of the attachment/detachment sensor 75 (S101). When a hydrogen storage unit 70 is replaced, a storage container 71 is replaced, and attachment of a new storage container 71 is detected. In a case where attachment of a new storage container 71 has not been detected, any hydrogen storage unit 70 has not been replaced.

In a case where a new storage container 71 has not been attached (S101: NO), the control unit 11 determines whether the on-off valve (A) 64 is closed or not (S102). In a case where the on-off valve (A) 64 is closed (S102: YES), the control unit 11 determines whether or not a pressure P(A) measured by the pressure sensor (A) 72 is equal to or lower than a predetermined pressure H1, or determines whether or not a temperature T of a heat medium measured by the temperature sensor 62 is equal to or lower than a predetermined temperature T1 (S103). In a state where the on-off valve 64 is closed, heating of the storage container 71 by flow of the heat medium through the branch passage 63 is not performed. The pressure H1 is a threshold to be used for determining that the hydrogen pressure in the storage container 71 is sufficient and not heating the storage container 71 in a case where the pressure in the storage container 71 exceeds the pressure H1. The pressure H1 is 170 kPa, for example. The temperature T1 is a threshold to be used for circulating the heat medium in a case where the temperature T of the heat medium is equal to or lower than the temperature T1. The temperature T1 is 40° C., for example.

In a case where the pressure P(A) is equal to or lower than the pressure H1 or the temperature T of the heat medium is equal to or lower than the temperature T1 (S103: YES), the control unit 11 opens the on-off valve (A) 64 (S104). Flow of the heat medium through the branch passage (A) 63 becomes possible, and heating of the storage container (A) 71 becomes possible. Next, the control unit 11 proceeds with the processing to S107. In a case where the pressure P(A) exceeds the pressure H1 and the temperature T of the heat medium exceeds the temperature T1 (S103: NO), the control unit 11 proceeds with the processing to S107. The on-off valve (A) 64 is kept close, and heating of the storage container (A) 71 by flow of the heat medium through the branch passage (A) 63 is not performed.

In a case where the on-off valve (A) 64 is opened (S102: NO), the control unit 11 determines whether the pressure P(A) is equal to or higher than a predetermined pressure H2 and the temperature T of the heat medium is equal to or higher than a predetermined temperature T2 or not (S105). In a state where the on-off valve 64 is opened, heating of the storage container 71 by flow of the heat medium through the branch container 63 can be performed. The pressure H2 is a threshold to be used for determining that the hydrogen pressure in the storage container 71 is insufficient and heating the storage container 71 in a case where the pressure in the storage container 71 is lower than the pressure H2. The pressure H2 is 200 kPa, for example. The temperature T2 is a threshold to be used for not circulating the heat medium in a case where the temperature T of the heat medium is equal to or higher than the temperature T2. The temperature T2 is 45° C., for example.

In a case where the pressure P(A) is equal to or higher than the pressure H2 and the temperature T of the heat medium is equal to or higher than the temperature T2 (S105: YES), the control unit 11 closes the on-off valve (A) 64 (S106). Heating of the storage container (A) 71 by flow of the heat medium through the branch passage (A) 63 is stopped. Next, the control unit 11 proceeds with the processing to S107. In a case where the pressure P(A) is lower than the pressure H2 or the temperature T of the heat medium is lower than the temperature T2 (S105: NO), the control unit 11 proceeds with the processing to S107. The on-off valve (A) 64 is kept open, and heating of the storage container (A) 71 by flow of the heat medium through the branch passage (A) 63 can be performed.

Next, the control unit 11 determines whether the on-off valve (B) 64 is closed or not (S107). In a case where the on-off valve (B) 64 is closed (S107: YES), the control unit 11 determines whether or not a pressure P(B) measured by the pressure sensor (B) 72 is equal to or lower than the pressure H1 or the temperature T of the heat medium is equal to or lower than the temperature T1 (S108).

In a case where the pressure P(B) is equal to or lower than the pressure H1 or the temperature T of the heat medium is equal to or lower than the temperature T1 (S108: YES), the control unit 11 opens the on-off valve (B) 64 (S109). Flow of the heat medium through the branch passage (B) 63 becomes possible, and heating of the storage container (B) 71 becomes possible. Next, the control unit 11 proceeds with the processing to S112. In a case where the pressure P(B) exceeds the pressure H1 and the temperature T of the heat medium exceeds the temperature T1 (S108: NO), the control unit 11 proceeds with the processing to S112. The on-off valve (B) 64 is kept close, and heating of the storage container (B) 71 by flow of the heat medium through the branch passage (B) 63 is not performed.

In a case where the on-off valve (B) 64 is opened (S107: NO), the control unit 11 determines whether or not the pressure P(B) is equal to or higher than the pressure H2 and the temperature T of the heat medium is equal to or higher than the pressure T2 (S110). In a case where the pressure P(B) is equal to or higher than the pressure H2 and the temperature T of the heat medium is equal to or higher than the pressure T2 (S110: YES), the control unit 11 closes the on-off valve (B) 64 (S111). Heating of the storage container (B) 71 by flow of the heat medium through the branch passage (B) 63 is stopped. Next, the control unit 11 proceeds with the processing to S112. In a case where the pressure P(B) is lower than the pressure H2 or the temperature T of the heat medium is lower than the temperature T2 (S110: NO), the control unit 11 proceeds with the processing to S112. The on-off valve (B) 64 is kept open, and heating of the storage container (B) 71 by flow of the heat medium through the branch passage (B) 63 becomes possible.

Next, the control unit 11 determines whether the on-off valve (A) 64 or the on-off valve (B) 64 is opened or not (S112). In a case where the on-off valve (A) 64 or the on-off valve (B) 64 is opened (S112: YES), the control unit 11 causes the pump 60 to operate (S113). In a case where the pump 60 is in operation, the pump 60 is kept in operation. Operation of the pump 60 circulates the heat medium through the heat medium passage 6. In a case where the on-off valve (A) 64 and the on-off valve (B) 64 are closed (S112: NO), the control unit 11 stops the pump 60 (S114). In a case where the pump 60 is out of operation, the pump 60 is kept out of operation.

After S113 or S114 is finished, the control unit 11 determines whether or not the temperature T of the heat medium is equal to or higher than a predetermined T3 (S115). The temperature T3 is a threshold to be used for heating the heat medium in a case where the temperature T of the heat medium is lower than the temperature T3. The temperature T3 is 23° C., for example. In a case where the temperature T of the heat medium is equal to or higher than the temperature T3 (S115: YES), the control unit 11 stops the heater 61 (S116). In a case where the heater 61 is out of operation, the heater 61 is kept out of operation. In a case where the temperature T of the heat medium is lower than the temperature T3 (S115: NO), the control unit 11 causes the heater 61 to operate (S117). In a case where the heater 61 is in operation, the heater 61 is kept in operation. The operation of the heater 61 heats the heat medium. After S116 or S117 is finished, the control unit 11 terminates the processing. Next, the control unit 11 repeats the processing from S101.

Heat generated from the fuel cell stack 10 is conducted to the heat medium in the second heat exchanger 42, and the heat medium is heated by the heater 61. The processes of S102 to S117 control the temperature of the heat medium to be equal to or higher than a predetermined temperature T3. The temperature T3 corresponds to a first temperature according to the present disclosure. The control unit 11, the fuel cell stack 10, the second heat exchanger 42, the pump 60, the heater 61, and the temperature sensor 62 are included in a temperature control unit according to the present disclosure. Moreover, the processes of S102 to S117 correspond to a first temperature control mode. In a case where the on-off valve (A) 64 is opened, the heat medium flows through the branch passage (A) 63, and the storage container (A) 71 is heated. In a case where the on-off valve (B) 64 is opened, the heat medium flows through the branch passage (B) 63, and the storage container (B) 71 is heated. In such a manner, the storage container 71 is heated, the hydrogen absorbing alloy in the storage container 71 is heated, hydrogen is released, and released hydrogen is supplied to the fuel cell stack 10.

Even in an embodiment in which the fuel cell 1 is provided with three or more storage containers 71, the control unit 11 performs processes similar to S101 to S117. The control unit 11 executes processes similar to the processes of S102 to S106 and the processes of S107 to S111 for each of the storage containers 71. Moreover, in the processes of S112 to 114, the control unit 11 executes the process of S113 in a case where any one on-off valve 64 is opened, or executes the process of S114 in a case where all on-off valves 64 are closed.

When a new storage container 71 is attached, the control unit 11 performs processing for heating the attached storage container 71. In a case where a hydrogen storage unit 70 housing a storage container 71 in which hydrogen has been consumed is replaced with a new hydrogen storage unit 70, the attachment/detachment sensor 75 detects that a new storage container 71 has been attached. Moreover, the attachment/detachment sensor 75 specifies the newly attached storage container 71. Here, assume that the hydrogen storage unit (A) 70 is not replaced and the hydrogen storage unit (B) 70 is replaced. That is, assume that the storage container (A) 71 is not replaced and a storage container (B) 71 is newly attached.

In a case where a new storage container 71 has been attached in S101 (S101: YES), the control unit 11 determines whether or not the pressure P(B) measured by the pressure sensor (B) 72 is equal to or higher than a predetermined pressure H3 (S21). The pressure H3 is a threshold to be used for determining that the hydrogen pressure in the storage container 71 is sufficient and not performing following processing for controlling the temperature of the heat medium in a case where the pressure in the newly attached storage container 71 is equal to or higher than the pressure H3. The pressure H3 is 100 kPa, for example. In a case where the pressure P(B) is equal to or higher than the pressure H3 (S21: YES), the control unit 11 proceeds with the processing to S102.

In a case where the pressure P(B) is lower than the pressure H3 (S21: NO), the control unit 11 closes the on-off valve (B) 64 (S22). In a case where the on-off valve (B) 64 is closed, the on-off valve (B) 64 is kept close. Next, the control unit 11 opens the on-off valve (A) 64 (S23). In a case where the on-off valve (A) 64 is opened, the on-off valve (A) 64 is kept open. Next, the control unit 11 causes the pump 60 to operate (S24). In a case where the pump 60 is in operation, the pump 60 is kept in operation. Next, the control unit 11 causes the heater 61 to operate (S25). In a case where the heater 61 is in operation, the heater 61 is kept in operation. The heat medium is heated in a state where the heat medium does not flow through the branch passage (B) 63 but flows through the branch passage (A) 63.

Next, the control unit 11 determines whether or not the temperature T of the heat medium is equal to or higher than a predetermined temperature T4 (S26). The temperature T4 is a target temperature for controlling the temperature T of the heat medium to be equal to or higher than the temperature in a state where the heat medium does not flow through the branch passage (B) 63. The temperature T4 is a temperature higher than the temperature T3. The temperature T4 is 40° C., for example. In a case where the temperature T of the heat medium is lower than the temperature T4 (S26: NO), the control unit 11 repeats the process of S26 until the temperature T of the heat medium becomes equal to or higher than the predetermined temperature T4. In a case where the temperature T of the heat medium is equal to or higher than the temperature T4 (S26: YES), the control unit 11 proceeds with the processing to S102.

A state where the pressure P(B) in a newly attached storage container (B) 71 is lower than the pressure H3 is a state where the storage container (B) 71 has not been heated, the temperature of the hydrogen absorbing alloy in the storage container (B) 71 is low, and the hydrogen cannot be released sufficiently. In the processes of S21 to S26, the storage container (B) 71 is not heated in a case where the pressure P(B) in the storage container (B) 71 is lower than the pressure H3. In a state where the storage container (B) 71 is not heated, the heat medium is heated, and the temperature T of the heat medium is controlled to be equal to or higher than the temperature T4. The temperature T4 corresponds to a second temperature according to the present disclosure. Moreover, the processes of S22 to S26 correspond to a second temperature control mode. After the temperature T of the heat medium becomes equal to or higher than the temperature T4, the second temperature control mode is finished, and the processing from S102, that is, the first temperature control mode is executed. In such a manner, the newly attached storage container (B) 71 is heated after the temperature of the heat medium is controlled to be a temperature equal to or higher than the temperature T4.

Even in an embodiment in which a fuel cell 1 is provided with three or more storage containers 71, the control unit 11 carries out processes similar to S21 to S26. In S23, the control unit 11 opens on-off valves 64 except the on-off valve (B) 64 related to a newly attached storage container (B) 71.

As described above in detail, the fuel cell 1 in this embodiment heats a plurality of storage containers 71 by carrying out the first temperature control mode (processes of S102 to S117) of controlling the temperature T of the heat medium to be equal to or higher than the temperature T3. Moreover, the fuel cell 1 can also carry out the second temperature control mode (processes of S22 to S26) of controlling the temperature T of the heat medium to be equal to or higher than the temperature T4 that is higher than the temperature T3. In a case where a new storage container 71 is attached, the fuel cell 1 determines whether the second temperature control mode is to be carried out or not based on the pressure in the attached storage container 71. In particular, the fuel cell 1 carries out the second temperature control mode in a case where the pressure in the attached storage container 71 is lower than the pressure H3.

The temperature of a newly attached storage container 71 may possibly become extremely lower than the other storage container 71. In a case where the temperature of a newly attached storage container 71 is extremely low, the temperature of the heat medium lowers, and the heat medium lacks the heat quantity for heating the other storage container 71. Lack of the heat quantity lowers the temperature of the other storage container 71, the temperature of the hydrogen absorbing alloy lowers, the hydrogen pressure lowers, and power generation in the fuel cell stack 10 may possibly become difficult. In a case where the temperature of a newly attached storage container 71 is low, the temperature of the hydrogen absorbing alloy therein is also low, and the pressure in the storage container 71 is low. It is therefore possible to estimate that the temperature of the storage container 71 is low based on the pressure in the storage container 71. A case where the pressure in an attached storage container 71 is lower than the pressure H3 is a case where the temperature of the storage container 71 is low. By carrying out the second temperature control mode in a case where the pressure in a newly attached storage container 71 is lower than the pressure H3, the temperature of the heat medium is controlled to be a temperature (e.g., equal to or higher than the temperature T4) exceeding the temperature T3, and lowering of the temperature of the heat medium due to a low temperature of an attached storage container 71 is suppressed. Lack of the heat quantity of the heat medium for heating the other storage container 71 is suppressed, and lowering of the temperature of the other storage container 71 is prevented. Therefore, lowering of the temperature of the hydrogen absorbing alloy and lowering of the hydrogen pressure are prevented, and hydrogen is stably supplied to the fuel cell stack 10. Accordingly, the fuel cell 1 according to this embodiment can execute continuous power generation.

Moreover, the fuel cell 1 in this embodiment carries out the second temperature control mode (processes of S22 to S26), finishes the second temperature control mode when the temperature T of the heat medium becomes equal to or higher than the temperature T4, and carries out the first temperature control mode (processes of S102 to S117). The fuel cell 1 does not heat a newly attached storage container 71 in the second temperature control mode but heats an attached storage container 71 in the first temperature control mode. That is, the fuel cell 1 starts heating of a newly attached storage container 71 after the temperature T of the heat medium is controlled to be equal to or higher than the temperature T4. Since heating of a newly attached storage container 71 is started after the temperature of the heat medium is controlled to be the temperature T4 exceeding the temperature T3, excessive lowering of the temperature of the heat medium due to a low temperature of the attached storage container 71 is prevented. Therefore, lowering of the temperature of the other storage container 71 is prevented.

Moreover, the fuel cell 1 in this embodiment carries out the second temperature control mode in a state where the on-off valve 64 configured to open and close a branch passage 63 for heating a newly attached storage container 71 is closed while the on-off valve 64 configured to open and close the branch passage 63 for heating the other storage container 71 is opened, in the processes of S22 to S26. Thus, the fuel cell 1 does not heat a newly attached storage container 71 when carrying out the second temperature control mode. Moreover, since the on-off valve 64 related to the other storage container 71 is opened, the heat medium is circulated through the heat medium passage 6, and the heat medium is heated as a whole by the second heat exchanger 42 and the heater 61.

Moreover, the fuel cell 1 in this embodiment is provided with the pressure sensor 71, and determines whether the second temperature control mode is to be carried out or not based on the pressure in the storage container 71 measured by the pressure sensor 72. The fuel cell 1 can select a proper temperature control method for the heat medium according to the state of a newly attached storage container 71 based on the measurement result of the pressure sensor 72. Moreover, the pressure sensor 72 in this embodiment is disposed upstream the hydrogen supply valve 73. Therefore, the pressure sensor 72 can measure the pressure in the storage container 71 even in a state where the hydrogen supply passage 73 is closed and hydrogen is not supplied from the storage container 71.

Although this embodiment has illustrated an aspect in which a pressure sensor 72 is provided as a detector, it is to be noted that the fuel cell 1 may have an aspect in which a temperature sensor configured to measure the temperature of the storage containers 71 is provided as a detector. In such an aspect, the fuel cell 1 determines whether the second temperature control mode is to be carried out or not based on the temperature of the storage container 71 measured by the temperature sensor. In particular, the temperature sensor measures the temperature of a newly attached storage container 71, and the control unit 11 in S21 proceeds with the processing to S22 in a case where the measured temperature is equal to or higher than a predetermined temperature T5, or proceeds with the processing to S102 in a case where the measured temperature is lower than the temperature T5. The temperature T5 is a threshold to be used for carrying out the second temperature control mode in a case where the temperature of the attached storage container 71 is lower than the temperature T5. The fuel cell 1 carries out the second temperature control mode in a case where the temperature of the attached storage container 71 is low, lack of the heat quantity of the heat medium is suppressed, and lowering of the temperature of the other storage container 7 can be prevented. Moreover, the fuel cell 1 may have an aspect in which both of the pressure sensor 72 and the temperature sensor are provided, and whether the second temperature control mode is to be carried out or not is determined based on the measurement results of the pressure sensor 72 and the temperature sensor.

Moreover, although this embodiment has illustrated an aspect in which the control unit 11 directly controls the pump 60, the heater 61, and the on-off valves 64, the fuel cell 1 may have an aspect in which a temperature control circuit for controlling the temperature of the heat medium is provided separately from the control unit 11. In such an aspect, the control unit 11 controls the temperature control circuit, and the temperature control circuit controls the pump 60, the heater 61, and a plurality of on-off valves 64. The temperature control circuit is included in a temperature control unit according to the present disclosure. Moreover, the fuel cell 1 may have an aspect in which the heat medium passage 6 is further provided with a heat radiation mechanism such as a radiator. In such an aspect, the control unit 11 or the temperature control circuit may perform processing of controlling the temperature of the heat medium to be equal to or lower than a predetermined upper limit temperature in the first temperature control mode by radiating the heat of the heat medium using the heat radiation mechanism. The heat radiation mechanism is included in a temperature control unit according to the present disclosure.

Moreover, although this embodiment has illustrated an aspect in which the attachment/detachment sensor 75 is used, the fuel cell 1 may have an aspect in which attachment of a storage container 71 is detected without using the attachment/detachment sensor 75. For example, the fuel cell 1 may have an aspect in which attachment of a new storage container 71 is detected based on the measurement result of the pressure sensor 72 or a temperature sensor configured to measure the temperature of the storage container 71 becoming a specific value, or the time variation of the measurement result indicating a specific variation.

Embodiment 2

Figure 4:
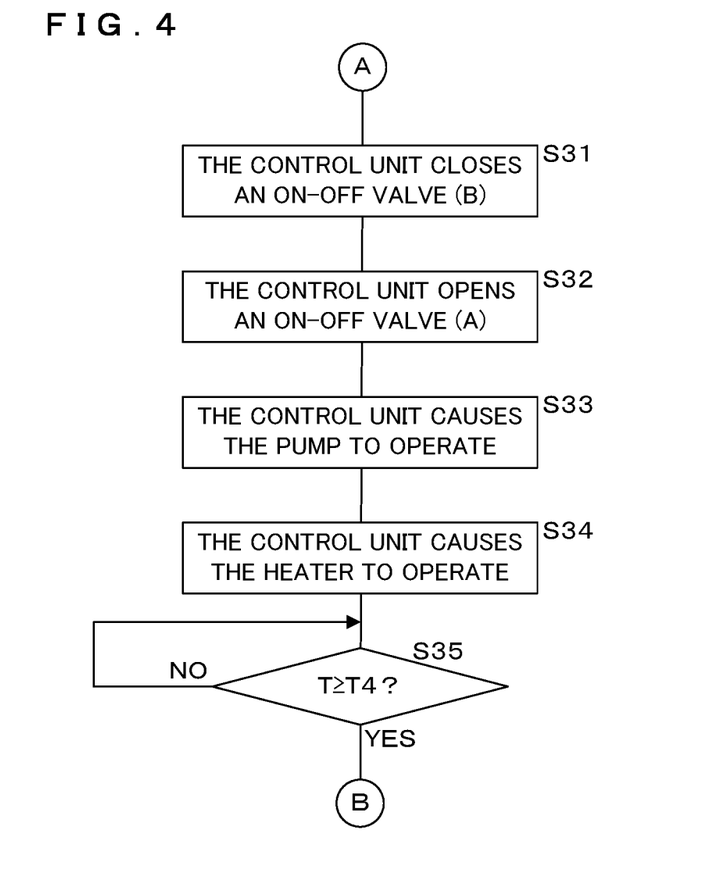
FIG. 4 is a flowchart illustrating partial process procedures in Embodiment 2.

The configuration of a fuel cell 1 according to Embodiment 2 is similar to Embodiment 1. Moreover, the fuel cell 1 according to Embodiment 2 executes the processes of S101 to S117 as with Embodiment 1. FIG. 4 is a flowchart illustrating partial process procedures in Embodiment 2. Processing of this embodiment will also be described assuming that a storage container (A) 71 is not replaced, and a storage container (B) 71 is newly attached. In a case where a new storage container 71 has been attached in S101 (S101: YES), the control unit 11 closes an on-off valve (B) 64 (S31). In a case where the on-off valve (B) 64 is closed, the on-off valve (B) 64 is kept close. Next, the control unit 11 opens an on-off valve (A) 64 (S32). In a case where the on-off valve (A) 64 is opened, the on-off valve (A) 64 is kept open. Next, the control unit 11 causes the pump 60 to operate (S33). In a case where the pump 60 is in operation, the pump 60 is kept in operation. Next, the control unit 11 causes the heater 61 to operate (S34). In a case where the heater 61 is in operation, the heater 61 is kept in operation. The heat medium is heated in a state where the heat medium does not flow through the branch passage (B) 63 but flows through the branch passage (A) 63.

Next, the control unit 11 determines whether the temperature T of the heat medium is equal to or higher than a predetermined temperature T4 or not (S35). In a case where the temperature T of the heat medium is lower than the temperature T4 (S35: NO), the control unit 11 repeats the process of S35 until the temperature T of the heat medium becomes equal to or higher than the predetermined temperature T4. In a case where the temperature T of the heat medium is equal to or higher than the temperature T4 (S35: YES), the control unit 11 proceeds with the processing to S102. Even in an aspect in which the fuel cell 1 is provided with three or more storage containers 71, the control unit 11 performs processes similar to S31 to S35. In S32, the control unit 11 opens on-off valves 64 except the on-off valve (B) 64 related to a newly attached storage container (B) 71.

The processes of S31 to S35 in this embodiment correspond to the second temperature control mode according to the present disclosure. The fuel cell 1 in this embodiment carries out the second temperature control mode when a new storage container 71 is attached. The temperature of a newly attached storage container 71 is likely to be lower than the other storage container 71. Since the second temperature control mode of controlling the temperature of the heat medium to be a temperature exceeding the temperature T3 is immediately carried out, lowering of the temperature of the heat medium due to a low temperature of the attached storage container 71 is suppressed, and lack of the heat quantity of the heat medium for heating the other storage container 71 is suppressed. Therefore, lowering of the temperature of the other storage container 71 is prevented, lowering of the temperature of the hydrogen absorbing alloy and lowering of the hydrogen pressure are prevented, and hydrogen is stably supplied to the fuel cell stack 10. Accordingly, the fuel cell 1 according to this embodiment can execute continuous power generation.

Moreover, the fuel cell 1 in this embodiment carries out the second temperature control mode (processes of S31 to S35), finishes the second temperature control mode in a case where the temperature T of the heat medium becomes equal to or higher than the temperature T4, and carries out the first temperature control mode (processes of S102 to S117). The fuel cell 1 does not heat a newly attached storage container 71 in the second temperature control mode but heats the attached storage container 71 in the first temperature control mode. That is, the fuel cell 1 starts heating of a newly attached storage container 71 after controlling the temperature T of the heat medium to be equal to or higher than the temperature T4. Since heating of a newly attached storage container 71 is started after the temperature of the heat medium is controlled to be the temperature T4, excessive lowering of the temperature of the heat medium due to a low temperature of the attached storage container 71 is prevented. Therefore, lowering of the temperature of the other storage container 71 is prevented.

Moreover, in the processes of S31 to S35, the fuel cell 1 in this embodiment carries out the second temperature control mode in a state where an on-off valve 64 configured to open and close a branch passage 63 for heating a newly attached storage container 71 is closed while the on-off valve 64 configured to open and close the branch passage 63 for heating the other storage container 71 is opened. In such a manner, the fuel cell 1 carries out the second temperature control mode without heating a newly attached storage container 71. Moreover, the heat medium passes through the on-off valve 64 related to the other storage container 71, is circulated through the heat medium passage 6, and is heated as a whole.

Embodiment 3

Figure 5:
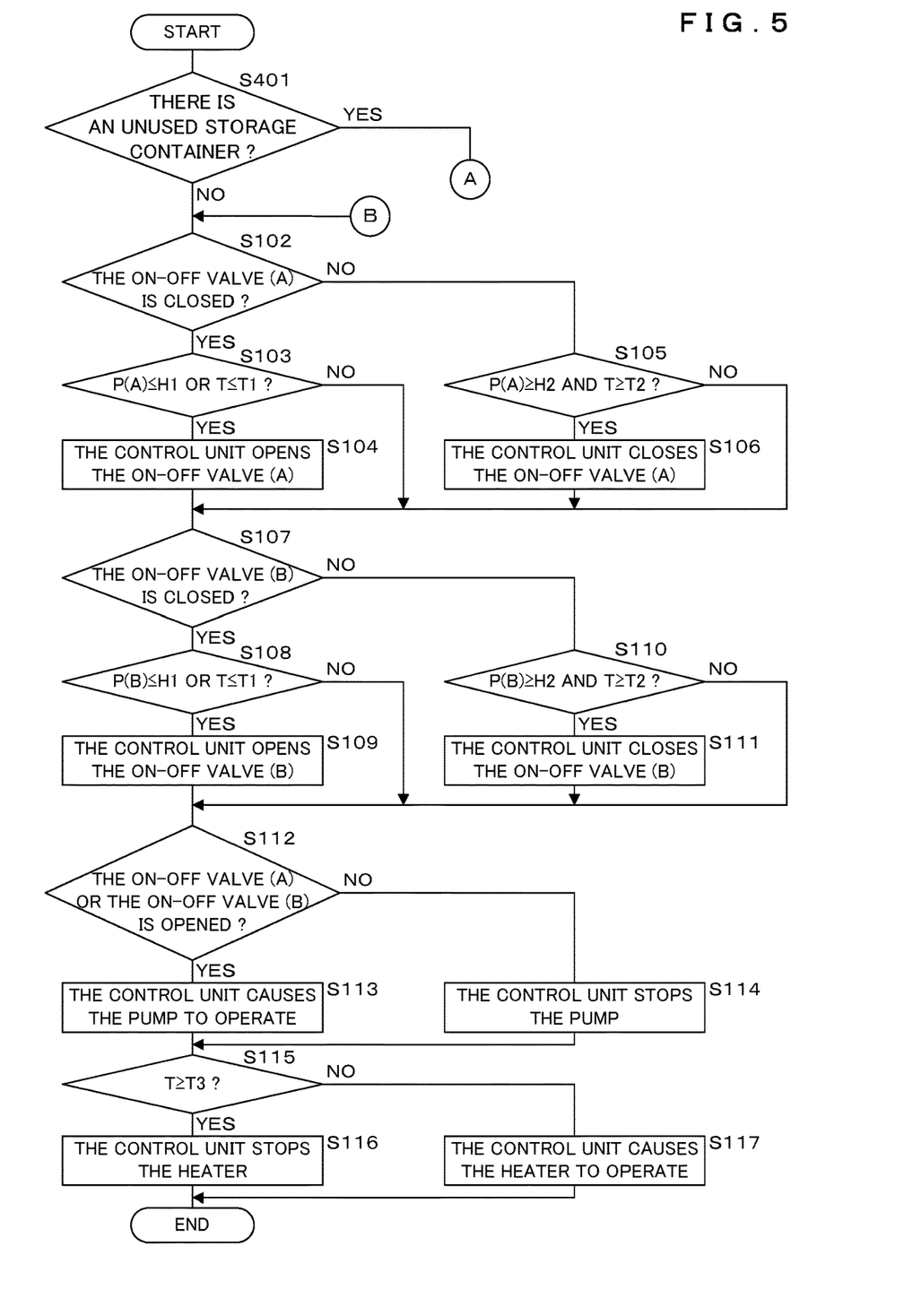
FIG. 5 is a flowchart illustrating partial process procedures in Embodiment 3.

The configuration of a fuel cell 1 according to Embodiment 3 is similar to Embodiment 1. FIG. 5 is a flowchart illustrating partial process procedures in Embodiment 3. The control unit 11 determines whether there is an unused storage container 71 in a plurality of storage containers 71 or not (S401). For example, an unused storage container 71 is a storage container 71 which has been newly attached by replacement of the hydrogen storage unit 70. As with Embodiment 1, the control unit 11 determines whether a new storage container 71 has been attached or not according to the detection result of the attachment/detachment sensor 75. Moreover, an unused storage container 71 is, for example, a storage container 71 which is provided in the fuel cell 1 in advance and has never been used for supply of hydrogen. In a case where such an unused storage container 71 is used for the first time, the control unit 11 determines that there is an unused storage container 71.

Moreover, in a case where a hydrogen supply unit 110 is replaced, a storage container 71 housed in a hydrogen storage unit 70 provided in a hydrogen supply unit 110 used for replacement, for example, is an unused storage container 71. The control unit 11 determines that there is an unused storage container 71 according to detection of replacement of a hydrogen supply unit 110. Moreover, in a case where a part including a part or the whole of a heat medium passage 6 and one or a plurality of hydrogen storage units 70 is replaced, a storage container 71 included in the replaced part, for example, is an unused storage container 71. The control unit 11 determines that there is an unused storage container 71 according to detection of replacement. Moreover, in a case where a hydrogen storage unit 70, a branch passage 63, and a hydrogen supply passage 74 are added, a storage container 71 housed in the added hydrogen storage unit 70, for example, is an unused storage container 71. The control unit 11 determines that there is an unused storage container 71 according to detection of addition.

In a case where there is no unused storage container 71 (S401: NO), the control unit 11 executes the processes of S102 to S117 as with Embodiment 1. After the process of S116 or S117 is finished, the control unit 11 terminates the processing. Next, the control unit 11 repeats the processing from S401. In a case where there is an unused storage container 71 (S401: YES), the control unit 11 executes the processes of S21 to S26 as with Embodiment 1 assuming that an unused storage container 71 is a storage container (B) 71 while the other storage container 71 is a storage container (A) 71.

The fuel cell 1 in this embodiment determines whether the second temperature control mode is to be carried out or not based on the pressure in an unused storage container 71 in a case where there is an unused storage container 71. In particular, the fuel cell 1 carries out the second temperature control mode in a case where the pressure in an unused storage container 71 is lower than a predetermined pressure H3. The temperature of the unused storage container 71 may possibly be extremely lower than the other storage container 71. In a case where the temperature of the unused storage container 71 is low, the pressure in the storage container 71 is low. It is therefore possible to estimate that the temperature of an unused storage container 71 is low based on the pressure in the storage container 71. A case where the pressure in an unused storage container 71 is lower than the pressure H3 is a case where the temperature of the storage container 71 is low. By carrying out the second temperature control mode in a case where the pressure in an unused storage container 71 is lower than the pressure H3, the temperature of the heat medium is controlled to be a temperature equal to or higher than the temperature T3, lowering of the temperature of the heat medium due to a low temperature of the unused storage container 71 is suppressed, and lack of the heat quantity of the heat medium for heating the other storage container 71 is suppressed. Therefore, lowering of the temperature of the other storage container 71 is prevented, lowering of the temperature of the hydrogen absorbing alloy and lowering of the hydrogen pressure are prevented, and hydrogen is stably supplied to the fuel cell stack 10. Accordingly, the fuel cell 1 according to this embodiment can execute continuous power generation.

It is to be noted that the fuel cell 1 may have an aspect in which a temperature sensor configured to measure the temperature of a storage container 71 is provided instead of the pressure sensor 72. In such an aspect, whether the second temperature control mode is to be carried out or not is determined based on the temperature of the storage container 71 measured by the temperature sensor. In particular, the temperature sensor measures the temperature of an unused storage container 71, and the control unit 11 proceeds with the processing to S22 in a case where the measured temperature is equal to or higher than a predetermined temperature T5, or proceeds with the processing to S102 in a case where the measured temperature is lower than the temperature T5. The fuel cell 1 carries out the second temperature control mode in a case where the temperature of the unused storage container 71 is low, suppresses lack of the heat quantity of the heat medium, and can prevent lowering of the temperature of the other storage container 71. Moreover, the fuel cell 1 may have an aspect in which both of the pressure sensor 72 and the temperature sensor are provided, and whether the second temperature control mode is to be carried out or not is determined based on the measurement results of the pressure sensor 72 and the temperature sensor.

Moreover, the fuel cell 1 may have an aspect in which the processes of S31 to S35 are executed as with Embodiment 2 in a case where there is an unused storage container 71 (S401: YES). In such an aspect, the fuel cell 1 carries out the second temperature control mode in a case where there is an unused storage container 71. Since the second temperature control mode of controlling the temperature of the heat medium to be equal to or higher than the temperature T3 is carried out immediately, lack of the heat quantity of the heat medium for heating the other storage container 71 is suppressed, and lowering of the temperature of the other storage container 71 is prevented.

As described above, a fuel cell 1 according to the present disclosure is a fuel cell characterized by comprising: a power generation unit 10 configured to react hydrogen and oxygen so as to generate electricity; a plurality of storage containers 71 that are detachable and house hydrogen absorbing alloy storing hydrogen to be supplied to the power generation unit 10; a heat medium passage 6 through which a heat medium for heating the plurality of storage containers 71 flows; and a temperature control unit configured to control the temperature of the heat medium, wherein the temperature control unit can carry out a first temperature control mode of controlling the temperature of the heat medium to be equal to or higher than a predetermined first temperature, and a second temperature control mode of controlling the temperature of the heat medium to be equal to or higher than a predetermined second temperature that is higher than the first temperature, and determines whether the second temperature control mode is to be carried out or not based on the pressure in a newly attached storage container 71 or the temperature of the storage container 71 when a new storage container 71 is attached.

By controlling the temperature of the heat medium to be equal to or higher than the second temperature that is higher than the first temperature in a case where the temperature of a newly attached storage container 71 is low, the fuel cell 1 according to the present disclosure suppresses lack of the heat quantity for heating the other storage container 71.

The fuel cell 1 according to the present disclosure is characterized in that the temperature control unit starts heating of the newly attached storage container 71 after the temperature control unit carries out the second temperature control mode and the temperature of the heat medium becomes equal to or higher than the second temperature.

In the present disclosure in which the fuel cell 1 starts heating of the newly attached storage container 71 after controlling the temperature of the heat medium to be equal to or higher than the second temperature, the temperature of the heat medium does not lower excessively even in a case where the temperature of the newly attached storage container 71 is low.

The fuel cell 1 according to the present disclosure is characterized in that the temperature control unit finishes the second temperature control mode and carries out the first temperature control mode after the temperature control unit carries out the second temperature control mode and the temperature of the heat medium becomes equal to or higher than the second temperature.

The fuel cell 1 according to the present disclosure starts heating of a newly attached storage container 71 by the second temperature control mode after the temperature of the heat medium is controlled by the second temperature control mode to be equal to or higher than the second temperature. The temperature of the heat medium does not lower excessively even in a case where the temperature of the newly attached storage container 71 is low.

The fuel cell 1 according to the present disclosure is characterized in that the heat medium passage 6 includes a plurality of branch passages 63 for heating the plurality of storage containers 71, and a plurality of on-off valves 64 configured to open and close the plurality of branch passages 63, and the temperature control unit closes an on-off valve 64 of a branch passage 63 for heating the attached storage container 71, and carries out the second temperature control mode in a state where the on-off valve 64 of the branch passage 63 for heating the other storage container 71 is opened.

The fuel cell 1 according to the present disclosure circulates the heat medium and heats the heat medium as a whole by opening on-off valves 64 of branch passages 63 for heating storage containers 71 except a newly attached storage container 71 in the process of carrying out the second temperature control mode.

The fuel cell 1 according to the present disclosure is a fuel cell characterized by further comprising a detector configured to detect the pressure or the temperature in each of the plurality of storage containers 71, wherein the temperature control unit determines whether the second temperature control mode is to be carried out or not based on the pressure or the temperature in the attached storage container 7 detected by the detector.

The fuel cell 1 according to the present disclosure, which determines whether the second temperature control mode is to be carried out or not based on the pressure or the temperature detected by the detector, can select a proper temperature control method of the heat medium according to the state of a newly attached storage container 71.

The fuel cell 1 according to the present disclosure is a fuel cell characterized by further comprising a plurality of hydrogen supply valves 73 configured to open and close flow of hydrogen to be supplied from the plurality of storage containers 71 to the power generation unit 10, wherein the detector includes a plurality of pressure sensors 72, and the pressure sensors 72 are disposed respectively upstream the hydrogen supply valves 73 in the flow of hydrogen.

Since each pressure sensor 72 according to the present disclosure is disposed upstream each hydrogen supply valve 73, the pressure sensor 72 can measure the pressure in the storage container 71 even in a state where hydrogen is not supplied from the storage container 71.

A fuel cell 1 according to the present disclosure is a fuel cell characterized by comprising: a power generation unit 10 configured to react hydrogen and oxygen so as to generate electricity; a plurality of storage containers 71 that are detachable and house hydrogen absorbing alloy storing hydrogen to be supplied to the power generation unit 10; a heat medium passage 6 through which a heat medium for heating the plurality of storage containers 71 flows; and a temperature control unit configured to heat the plurality of storage containers 71 by controlling the temperature of the heat medium and causing the heat medium to flow through the heat medium passage 6, wherein the temperature control unit can carry out a first temperature control mode of controlling the temperature of the heat medium to be equal to or higher than a predetermined first temperature, and a second temperature control mode of controlling the temperature of the heat medium to be equal to or higher than a predetermined second temperature that is higher than the first temperature, and carries out the second temperature control mode when a new storage container 71 is attached.

Since the fuel cell 1 according to the present disclosure controls the temperature of the heat medium to be equal to or higher than a second temperature that is higher than the first temperature when a new storage container 71 is attached, lack of the heat quantity for heating the other storage container 71 under an influence of the temperature of the newly attached storage container 71 is suppressed.

A fuel cell 1 according to the present disclosure is a fuel cell characterized by comprising: a power generation unit 10 configured to react hydrogen and oxygen so as to generate electricity; a plurality of storage containers 71 that are detachable and house hydrogen absorbing alloy storing hydrogen to be supplied to the power generation unit 10; a heat medium passage 6 through which a heat medium for heating the plurality of storage containers 71 flows; and a temperature control unit configured to heat the plurality of storage containers 71 by controlling the temperature of the heat medium and causing the heat medium to flow through the heat medium passage 6, wherein the temperature control unit can carry out a first temperature control mode of controlling the temperature of the heat medium to be equal to or higher than a predetermined first temperature, and a second temperature control mode of controlling the temperature of the heat medium to be equal to or higher than a predetermined second temperature that is higher than the first temperature, and determines whether the second temperature control mode is to be carried out or not based on the pressure or the temperature in an unused storage containers 71 in a case where there is the unused storage container 71 in the plurality of storage containers 71.

Since the fuel cell 1 according to the present disclosure controls the temperature of the heat medium to be equal to or higher than the second temperature that is higher than the first temperature in a case where the temperature of an unused storage container 71 is low, lack of the heat quantity for heating the other storage container is suppressed.

A temperature control method according to the present disclosure is a temperature control method, which uses a power generation unit 10 configured to react hydrogen and oxygen so as to generate electricity, a plurality of storage containers 71 that are detachable and house hydrogen absorbing alloy storing hydrogen to be supplied to the power generation unit 10, and a heat medium passage 6 through which a heat medium for heating the plurality of storage containers 71 flows, the temperature control method being characterized by comprising steps of: controlling the temperature of the heat medium to be equal to or higher than a predetermined first temperature; heating the plurality of storage containers 71 by causing the heat medium to flow through the heat medium passage 6; controlling the temperature of the heat medium to be equal to or higher than a predetermined second temperature that is higher than the first temperature without heating an attached storage container 71 when a new storage container 71 is attached; and starting heating of the attached storage container 71 after the temperature of the heat medium becomes equal to or higher than the second temperature.

Since the fuel cell 1 according to the present disclosure controls the temperature of the heat medium to be equal to or higher than the second temperature that is higher than the first temperature when a new storage container 71 is attached, and starts heating of the attached storage container 71 after the temperature of the heat medium becomes equal to or higher than the second temperature, the temperature of the heat medium does not lower excessively even in a case where the temperature of the newly attached storage container 71 is low.

The embodiments disclosed herein are illustrative in all aspects and should be considered not restrictive. The scope of the present invention is defined not by the above meanings but by the claims and is intended to include all modifications within the scope and the meanings equivalent to the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A fuel cell, comprising:
   a power generation unit configured to react hydrogen and oxygen so as to generate electricity;
   a plurality of storage containers that are detachable and house hydrogen absorbing alloy storing hydrogen to be supplied to the power generation unit;
   a coolant passage through which a heat medium for cooling the power generation unit flows;
   a heat medium passage which is separated from the coolant passage and through which a heat medium for heating the plurality of storage containers flows; and a temperature control unit configured to control temperature of the heat medium,
wherein the heat medium passage includes a plurality of branch passages for heating the plurality of storage containers,
the temperature control unit includes:
  a heater configured to heat the heat medium which flows through the heat medium passage; and
  a temperature sensor configured to measure temperature of the heat medium which flows through the heat medium passage,
the temperature control unit can carry out a first temperature control mode of controlling the temperature of the heat medium measured by the temperature sensor to be equal to or higher than a predetermined first temperature by using the heater, and a second temperature control mode of controlling the temperature of the heat medium measured by the temperature sensor to be equal to or higher than a predetermined second temperature that is higher than the first temperature by using the heater,
the temperature control unit determines whether the second temperature control mode is to be carried out or not based on pressure in an unused storage container or temperature related to an unused storage container in a case where there is an unused storage container in the plurality of storage containers,
the temperature control unit, when the second temperature control mode is to be carried out, carries out the second temperature control mode in a state where the heat medium does not flow through a branch passage for heating the unused storage container, and
the temperature control unit starts heating of the unused storage container by causing the heat medium to flow through the branch passage after the temperature of the heat medium measured by the temperature sensor becomes equal to or higher than the second temperature.

2. The fuel cell according to claim 1, wherein
the temperature control unit finishes the second temperature control mode and caries out the first temperature control mode after the temperature control unit carries out the second temperature control mode and the temperature of the heat medium measured by the temperature sensor becomes equal to or higher than the second temperature.

3. The fuel cell according to claim 1, wherein
the heat medium passage further includes
a plurality of on-off valves configured to open and close the plurality of branch passages, and
the temperature control unit carries out the second temperature control mode in a state where an on-off valve of a branch passage for heating the unused storage container is closed and an on-off valve of a branch passage for heating the other storage container.

4. The fuel cell according to claim 1, further comprising
a detector configured to detect respective pressures in the plurality of storage containers or respective temperatures of the plurality of the storage containers,
wherein the temperature control unit determines whether the second temperature control mode is to be carried out or not based on a pressure in the unused storage container detected by the detector, or a temperature related to the unused storage container detected by the detector.

5. The fuel cell according to claim 4, further comprising
a plurality of hydrogen supply valves configured to open and close flow of hydrogen to be supplied from the plurality of storage containers to the power generation unit,
wherein the detector includes a plurality of pressure sensors, and
the respective pressure sensors are arranged upstream the respective hydrogen supply valves in flow of hydrogen.

6. The fuel cell according to claim 1, wherein
the unused storage container is a storage container newly attached to the fuel cell.

7. The fuel cell according to claim 1, wherein
the second temperature control mode is carried out when a new storage container is attached.

* * * * *